(12) United States Patent
Roy et al.

(10) Patent No.: US 8,663,855 B2
(45) Date of Patent: Mar. 4, 2014

(54) FUEL CELL PROTECTION DEVICE

(75) Inventors: Mathieu Roy, Joue les Tours (FR); Jean-Yves Laurent, Domene (FR)

(73) Assignees: STMicroelectronics (Tours) SAS, Tours (FR); Commissariat à l'Energie Atomique et aux Énergies Alternatives, Paris (FR)

( * ) Notice: Subject to any disclaimer, the term of this patent is extended or adjusted under 35 U.S.C. 154(b) by 734 days.

(21) Appl. No.: 12/809,172

(22) PCT Filed: Dec. 23, 2008

(86) PCT No.: PCT/FR2008/052405
§ 371 (c)(1),
(2), (4) Date: Aug. 31, 2010

(87) PCT Pub. No.: WO2009/081080
PCT Pub. Date: Jul. 2, 2009

(65) Prior Publication Data
US 2010/0317411 A1 Dec. 16, 2010

(30) Foreign Application Priority Data
Dec. 24, 2007 (FR) .................. 07 60348

(51) Int. Cl.
*H01M 8/06* (2006.01)
(52) U.S. Cl.
USPC ............ 429/414; 429/413; 429/408

(58) Field of Classification Search
USPC .................. 429/400, 413, 414
See application file for complete search history.

(56) References Cited

U.S. PATENT DOCUMENTS

| | | | |
|---|---|---|---|
| 8,003,266 B2 | 8/2011 | Kajitani et al. | |
| 2004/0209133 A1 | 10/2004 | Hirsch et al. | |
| 2005/0106441 A1 | 5/2005 | Yamamoto et al. | |
| 2007/0072040 A1 | 3/2007 | Kouassi et al. | |
| 2007/0072049 A1* | 3/2007 | Sadamoto | 429/38 |
| 2007/0218338 A1 | 9/2007 | Imura et al. | |
| 2007/0228740 A1 | 10/2007 | Suso | |

FOREIGN PATENT DOCUMENTS

| | | |
|---|---|---|
| JP | 2002014343 A | 1/2002 |
| JP | 2004055307 A | 2/2004 |
| JP | 2005-32517 A | 2/2005 |
| JP | 2007088804 A | 4/2007 |
| JP | 2007149565 A | 6/2007 |
| WO | WO 2005045972 A1 | 5/2005 |

OTHER PUBLICATIONS

International Search Report dated Jul. 2, 2009 from corresponding International Application No. PCT/FR2008/052405.

* cited by examiner

*Primary Examiner* — Matthew Merkling
(74) *Attorney, Agent, or Firm* — Wolf, Greenfield & Sacks, P.C.

(57) ABSTRACT

A hydrogen-air fuel cell having a mobile element capable of, in closed position, covering the cell cathode in substantially tight fashion.

20 Claims, 3 Drawing Sheets

FUEL CELL PROTECTION DEVICE

CROSS REFERENCE TO RELATED APPLICATIONS

This application is a U.S. National Stage filing of International Application No. PCT/FR2008/052405, titled "FUEL CELL PROTECTION DEVICE," filed on Dec. 23, 2008, which application claims the priority benefit of French patent application Ser. No. 07/60348, filed on Dec. 24, 2007, which application is hereby incorporated by reference to the maximum extent allowable by law.

BACKGROUND OF THE INVENTION

1. Field of the Invention

The present invention relates to the use of hydrogen-air fuel cells in portable devices. Such fuel cells are generally formed of one or several silicon wafers, each of which contains a large number of microcells.

2. Discussion of the Related Art

Hydrogen-air fuel cells especially aim at equipping portable electronic equipment such as computers, telephones, music readers, and others.

FIG. 1 shows an example of an integrated microcell fuel cell formed by using microelectronics techniques. This cell is formed on a silicon wafer 1 coated with a first thin insulating layer 2 and with a second thicker insulating layer 3. An opening is formed in this portion of insulating layer 3. In this opening is housed a stack of a catalyst support 4, of a first catalyst layer 5, of an electrolyte 6, and of a second catalyst layer 7. This layer assembly forms the active stack of the fuel cell. An electrode 10 placed on first insulating layer 2 enables taking a contact on the lower surface of the fuel cell, on support 4. An opening in second insulating layer 3 enables accessing electrode 10. An upper electrode 11 enables taking a contact on upper catalyst layer 7. Electrodes 10 and 11 are perforated and channels 13 are formed in silicon wafer 1 opposite to the perforations in the lower surface metallization. Lower electrode 10 and upper electrode 12 respectively form an anode collector and a cathode collector.

Electrolyte 6 is, for example, a polymer acid such as Nafion in solid form and catalyst layers 5 and 7 are, for example, carbon and platinum based layers. This is an example of embodiment only. Various types of fuel cells that can be formed as illustrated in FIG. 1 are known in the art.

To operate the fuel cell, hydrogen is injected in the direction indicated by arrow $H_2$ on the lower surface side and air (oxygen carrier) is injected on the upper surface side. The hydrogen is "broken down" at the level of catalyst layer 5 to form, on the one hand, H+ protons which direct towards electrolyte 6 and, on the other hand, electrons which direct towards the outside of the cell through anode collector 10. The H+ protons cross electrolyte 6 to join catalyst layer 7 where they recombine with oxygen and with electrons to form water microdroplets.

It should be underlined that FIG. 1 is not to scale. In particular, silicon wafer 1 typically has a thickness on the order of from 250 to 700 µm while the active stack of layers 4 to 7 typically has a thickness on the order of from 30 to 50 µm.

A conventional fuel cell is formed of a large number of adjacent cells of the type shown in FIG. 1, generally several hundreds, integrated on the same substrate and properly connected. In practice, a fuel cell battery (which will be called "cell" hereafter) usable in portable devices such as cell phones should have a surface area in contact with the air on the order of a few square centimeters (for example, with a side from 2 to 3 cm).

The Applicants have noted that, when such fuel cells are used in portable devices, and when the cell stopped being used for a given time, the restarting would be difficult, that is, for a given time after the restarting, the fuel cell would be incapable of providing the desired nominal current.

SUMMARY OF THE INVENTION

It would be desirable to overcome the disadvantages of prior art and more specifically to provide a fuel cell capable of restarting rapidly and efficiently as soon as it is operated, even after a relatively long period of non-use (for example, on the order of from a few days to a few weeks according to the environmental conditions).

Thus, an embodiment a device comprising a hydrogen-air fuel cell comprising a mobile element capable of, in closed position, covering the cathode of the cell in substantially tight fashion.

According to an embodiment of the present invention, the portion of the mobile element covering the cathode of the cell comprises a recess containing a hydrophilic substance.

According to an embodiment, the mobile element is formed of an assembly of grids forming a flap.

An embodiment provides a cell phone comprising a device such as hereabove.

According to an embodiment, the cell phone is of slider phone type having one element sliding with respect to the other, the cell being arranged on one of the two sliding elements, so that, in open position, the cell cathode is exposed and that, in closed position, the cell closes a recess defined in the opposite element.

According to an embodiment, cell is substantially at the back of the cell phone display.

The foregoing objects, features, and advantages of the present invention will be discussed in detail in the following non-limiting description of specific embodiments in connection with the accompanying drawings.

DETAILED DESCRIPTION

The assembly of FIGS. 2A-2B and 3A-3B shows an example of a slider cell phone, respectively in top view and in side view, and respectively in closed position and in open position.

Figure 1:
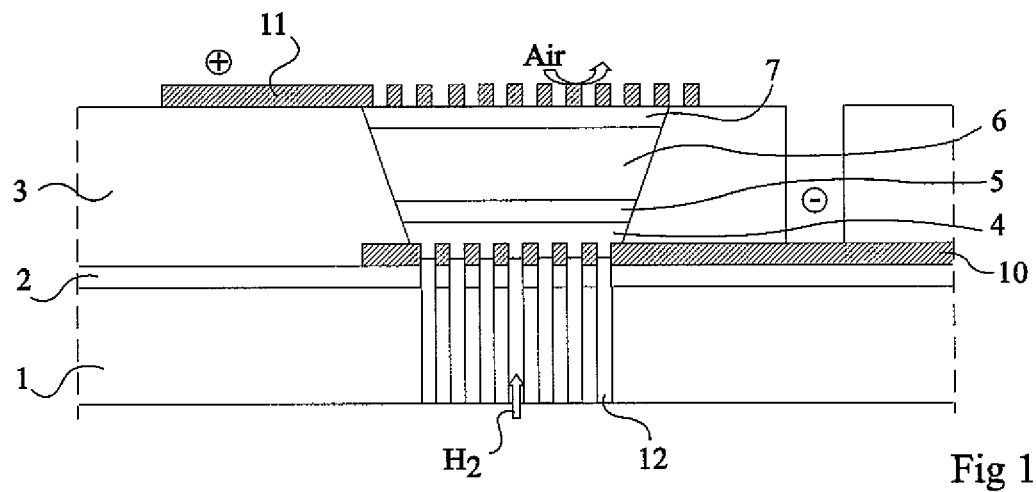
FIG. 1, described hereabove, schematically shows a microcell fuel cell.
Figure 2A:
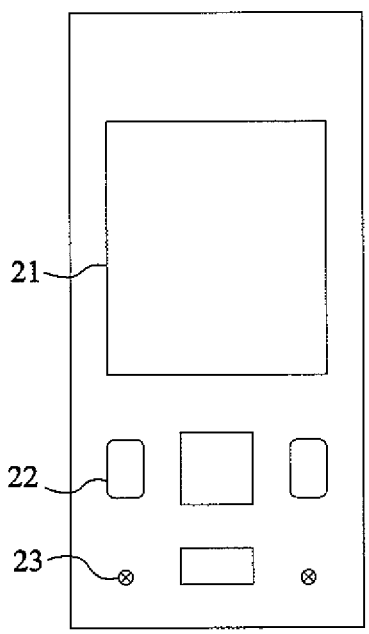
FIGS. 2A and 2B are top views of an example of a cell phone incorporating an embodiment of the present invention, respectively in closed position and in open position.
Figure 3A:
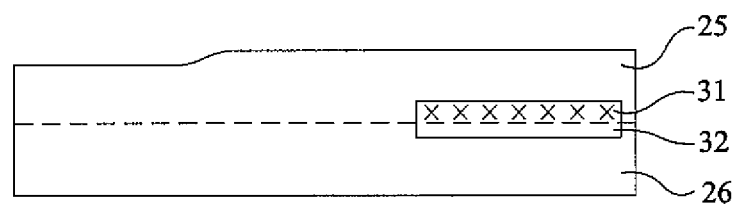
FIGS. 3A and 3B are side views of an example of a cell phone incorporating an embodiment respectively in closed position and in open position.

In closed position, FIG. 2A shows the front surface of the cell phone and FIG. 3A is a side view. In this example, the front surface comprises a display 21 and an area comprising control buttons 22 and pilot lamps 23. As illustrated in FIG. 3A, the cell phone is divided in two elements: an upper element 25 and a lower element 26. Upper element 25 may slide with respect to lower element 26, for example, by means of slide rails, not shown.

Figure 2B:
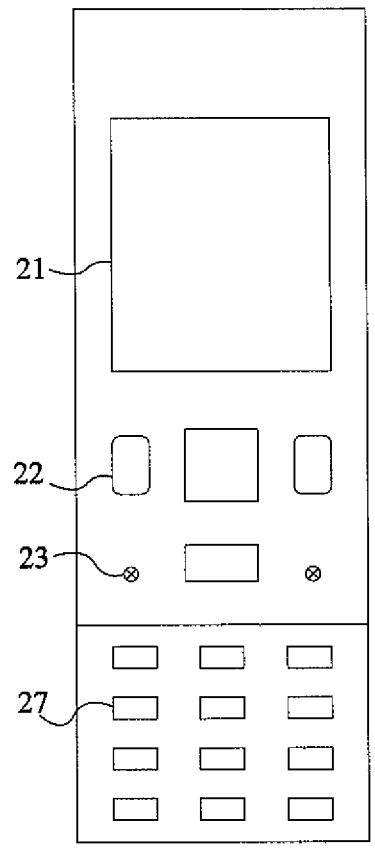
Figure 3B:
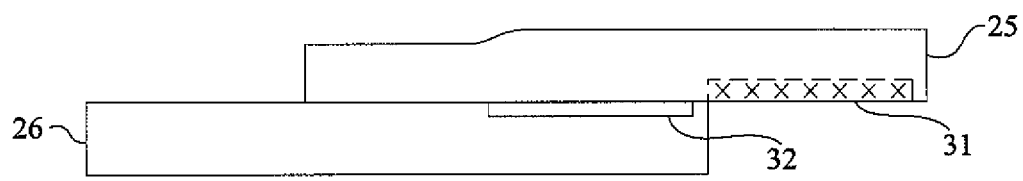

As illustrated in FIGS. 2B and 3B, in open position, when the upper element has been slid with respect to the lower element, a keyboard area 27 is exposed on the front surface side and generally a switch is operated to set the telephone to an active state. Many alternative slide systems and many variations of the aspect of the cell phone and of the arrangement of the various displays, keys, and pilot lamps are possible and are used. For simplification, an extremely simplified telephone contour shape has been shown; generally, manufacturers adopt various specific shapes to obtain better ergonomics and/or for aesthetic considerations.

As illustrated in FIGS. 3A and 3B, the lower surface of upper element 25 comprises a recess in which is inserted a fuel cell 31 having an exposed cathode. The upper surface of lower element 26 comprises a recess 32 arranged so that, when the phone is in closed position, the cathode surface of fuel cell 31 comes in front of recess 32. In open position after the sliding of the two telephone elements with respect to each other, the cathode surface of fuel cell 31 becomes exposed.

Figure 4:
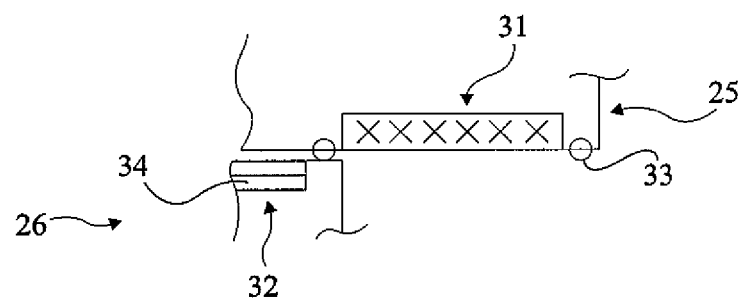
FIG. 4 is an enlargement of a portion of FIG. 3B.

Thus, when the cell phone is in the open position (in operating position), the exposed surface of fuel cell 31 is exposed to the ambient air. Of course, the other surface of fuel cell 31 is in communication with a hydrogen source or tank, not shown. In closed position, recess 32 of lower element 26 which comes in front of cell 31 exhibits a periphery such that recess 32 defines with the cathode surface of cell 31 a substantially tight enclosure. This is better shown in the enlarged view of FIG. 4 in which a peripheral seal 33 which cooperates with an opposite surface at the periphery of recess 32 can be seen around cell region 31. This seal is a possible example only of means for defining a substantially tight enclosure. Recess 32 preferably contains a hydrophilic material 34 capable of holding the humidity.

The device operation is the following. In the open position, the fuel cell operates conventionally by having a surface exposed to air and the other one exposed to hydrogen. In a preferred embodiment, cell 31 is arranged at the back of the display placed on the opposite surface of upper element 25. Indeed, generally, the user of a cell phone does not place his or her hand in front of the screen, but in front of the keyboard to better press the keys thereof. Thus, the user's hand is not likely to hinder the operation of the fuel cell, the cathode of which should be exposed to the ambient air.

In closed position, recess 32 is in front of cell 31 and covers the cell. If a hydrophilic element 14 initially imbibed with water is provided in recess 32, in closed position, the cell cathode is in a water-saturated vapor environment and the cells do not "dry". The Applicants have acknowledged that the fact of thus maintaining during non-use periods the cathode surface of the cell in air saturated with humidity, results in that on restarting of the cell, said cell is immediately capable of providing the nominal voltage and current which are expected therefrom. However, in the absence of the described protection, the cell very rapidly degrades, that is, it takes some time to restart and to be able to provide its nominal power, especially in dry atmosphere.

To keep the exposed cathode of the cell in a saturated vapor atmosphere, it is preferable to provide a hydrophilic material 14 in recess 32. This is however not necessary. Indeed, after a given operating time, the cell cathode surface becomes loaded with water microdroplets and, when the structure is closed back, the microdroplets progressively evaporate in the cavity and if said cavity is actually tight, an atmosphere saturated with humidity is maintained. It should be understood that then, if an atmosphere saturated with humidity is desired to be kept for a long time period, it needs to be especially ascertained to have a good tightness of the assembly between the two sliding portions.

A specific application of the present invention to a slider cell phone has been described previously. Generally, embodiments of the present invention apply to any cell-powered portable device, such as a palmtop computer or a portable game console. The present invention also applies to a stand alone voltage source (a charger) intended to be connected to an electric device. In the field of cell phones, there exist systems other than slider systems, for example, flip-down display systems. In any structure comprising two elements, one of which is mobile with respect to the other, it may be provided that one of the two elements comprises a fuel cell having an exposed cathode and that the other element comprises a recess intended to create, when the structure is closed, a substantially tight cavity saturated with humidity opposite to the cell cathode.

Figure 5:
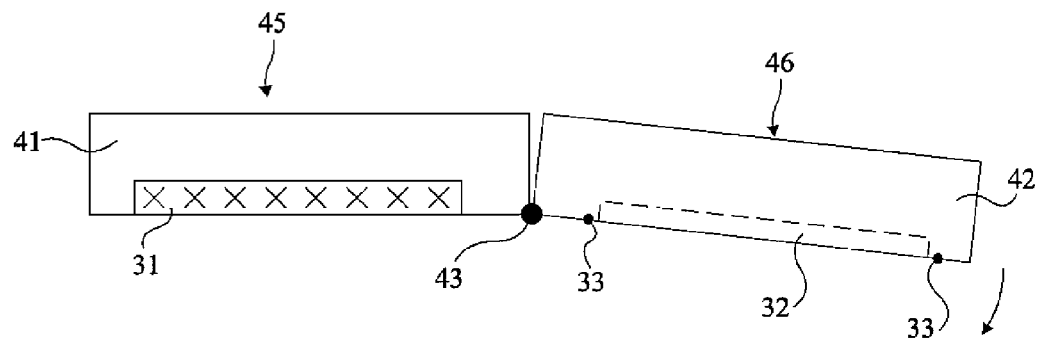
FIG. 5 schematically shows a device according to an alternative embodiment.

FIG. 5 illustrates a first variation of a device according to embodiments of the present invention. The device is formed of two portions 41 and 42 jointed by a hinge 43. The device is shown in almost fully open position. The lower surface of left-hand portion 41 of the device comprises a cell or a cell battery 31 having an exposed cathode and having its lower portion 42 comprising a recess 32. Recess 32 is surrounded with a seal or another sealing means 33 bearing against the lower surface of portion 41 at the periphery of cell 31 when the device is closed back. Upper surfaces 45 and 46 of foldable portions 41 and 42 comprise any means useful to the device use. For example, surface 45 comprises a screen and surface 46 comprises a keyboard. In this embodiment, as in the previous one, the position of a hydrogen cartridge intended to supply the cell is not illustrated. This cartridge could be inserted into one of portions 41 and 42 or be plugged on one of these portions.

Figure 6:
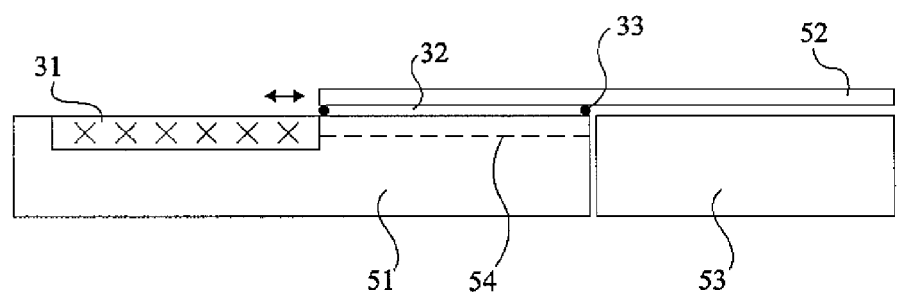
FIG. 6 schematically shows a device according to another alternative embodiment.

FIG. 6 is a side view of another alternative embodiment of a device according to the present invention. The device comprises two portions: a fixed portion 51 and a mobile flap 52. Mobile flap 52 can be shifted to cover the upper surface of a fuel cell 31 arranged to the left of portion 51. In fixed portion 51, a hydrogen cartridge 53 connected to the cell by a duct 54 can be plugged.

Figure 7:
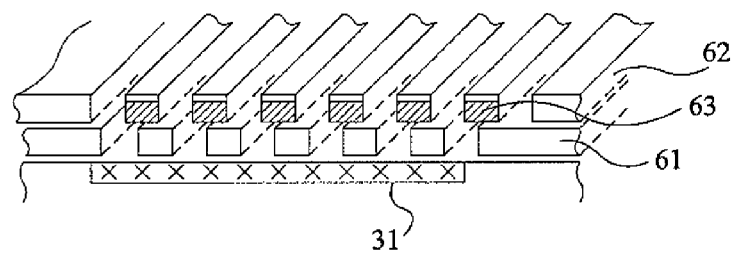
FIG. 7 illustrates an alternative embodiment.

In some applications, it may be provided for the mobile element not to define a cover in one piece but to be formed, for example, of two grid assemblies sliding with respect to each other to form a sliding flap. As shown in FIG. 7, the cathode of cell 31 faces a first grid 61 and a second grid 62. Each of the two grids is formed of parallel bars. One of the two grids is capable of sliding with respect to the other. In FIG. 5, the structure is shown at an intermediary position. It should be understood that, when the bars of grids 61 and 62 face one another, the upper surface of fuel cell assembly 31 is exposed to the air oxygen. When the two grids are in alternated position, a closed structure forms above cell 31, such that the cell faces the lower surfaces of gates 61 and 62, with the lower surface of upper grid 62 preferably supporting a hydrophilic material 63.

Of course, the present invention is likely to have various alterations, modifications and improvements which will readily occur to those skilled in the art. Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A device comprising:
   a hydrogen-air fuel cell; and
   a mobile element movable between a closed position in which the fuel cell is inoperative and an open position in which the fuel cell is operative, wherein the mobile element is capable of, in the closed position, covering a cathode of the fuel cell in substantially tight fashion, wherein, in the closed position, a portion of the mobile element covering the cathode of the fuel cell comprises a recess containing a hydrophilic substance,
   wherein, in the open position, at least a portion of the recess does not cover the cathode.

2. The device of claim 1, wherein the mobile element comprises an assembly of grids forming a flap.

3. A cell phone comprising the device of claim 1.

4. The cell phone of claim 3, wherein:
   the cell phone is of a slider phone type having a first element configured to slide with respect to a second element, the fuel cell being arranged on the first element,
   the second element comprises the mobile element,
   in the open position, the cell cathode is exposed, and
   in the closed position, the cell closes a recess defined in the second element.

5. The cell phone of claim 3, wherein the fuel cell is substantially at a back of the cell phone display.

6. The device of claim 1, wherein the fuel cell is configured to transition from an operative state to an inoperative state in response to the mobile element moving to the closed position in which the recess covers the cathode.

7. The device of claim 1, further comprising a seal, wherein, in the closed position, a sealed cavity is formed by at least a portion of the cathode, the recess, and the seal.

8. The device of claim 7, wherein the sealed cavity is configured to maintain, in the sealed cavity, an atmosphere saturated with humidity.

9. A device comprising:
   a fuel cell; and
   a mobile element configured to move between a first position, in which the fuel cell is inoperative and a recess formed in a portion of the mobile element covers a cathode of the fuel cell, and a second position, in which the fuel cell is operative and at least a portion of the recess does not cover the cathode,
   wherein the recess contains a hydrophilic substance.

10. The device of claim 9, wherein the fuel cell is configured to transition from an operative state to an inoperative state in response to the mobile element moving to the first position in which the recess covers the cathode.

11. The device of claim 9, further comprising:
    a fuel-cell housing, the fuel cell being attached to the fuel-cell housing, the mobile element being configured to move relative to the fuel-cell housing; and
    a peripheral seal configured to contact a surface of the fuel-cell housing and a surface of the mobile element when the mobile element is in the first position in which the recess covers the cathode, thereby forming a sealed cavity,
    wherein a surface of the cathode is exposed to the sealed cavity.

12. The device of claim 11, wherein the sealed cavity is configured to maintain, in the sealed cavity, an atmosphere saturated with humidity.

13. The device of claim 9, wherein the fuel cell is a hydrogen-air fuel cell.

14. A method comprising:
    during a period in which a fuel cell is inoperative, exposing a cathode of the fuel cell to a sealed cavity, the sealed cavity including a hydrophilic substance; and
    starting operation of the fuel cell by moving a surface of the sealed cavity or the fuel cell to expose the cathode of the fuel cell to ambient air.

15. The method of claim 14, wherein the fuel cell is a hydrogen-air fuel cell.

16. The method of claim 14, further comprising maintaining, in the sealed cavity, an atmosphere saturated with humidity.

17. The method of claim 14, wherein exposing the cathode of the fuel cell to the sealed cavity comprises positioning a periphery of the fuel cell and a periphery of the cavity within a peripheral seal by sliding a first housing containing the fuel cell with respect to a second housing containing the cavity.

18. The method of claim 14, further comprising immediately providing nominal voltage and current from the fuel cell in response to starting operation of the fuel cell.

19. A device comprising:
    a fuel cell; and
    means for exposing a cathode of the fuel cell to a sealed cavity including a hydrophilic substance during a period when the fuel cell is inoperative, and for starting operation of the fuel cell by exposing the cathode of the fuel cell to ambient air.

20. The device of claim 19, wherein the fuel cell is a hydrogen-air fuel cell.

* * * * *